US012699232B2

(12) United States Patent
Abe et al.

(10) Patent No.: US 12,699,232 B2
(45) Date of Patent: Aug. 4, 2026

(54) OPTICAL CONNECTOR PLUG, OPTICAL CONNECTOR AND MANUFACTURING METHOD OF OPTICAL WAVEGUIDE

(71) Applicant: NTT, Inc., Tokyo (JP)

(72) Inventors: Yoshiteru Abe, Musashino (JP); Yoko Yamashita, Musashino (JP); Taiji Sakamoto, Musashino (JP); Takashi Matsui, Musashino (JP); Kazuhide Nakajima, Musashino (JP); Kazunori Katayama, Musashino (JP)

(73) Assignee: NTT, Inc., Tokyo (JP)

( * ) Notice: Subject to any disclaimer, the term of this patent is extended or adjusted under 35 U.S.C. 154(b) by 262 days.

(21) Appl. No.: 18/570,431

(22) PCT Filed: Jun. 21, 2021

(86) PCT No.: PCT/JP2021/023427
§ 371 (c)(1),
(2) Date: Dec. 14, 2023

(87) PCT Pub. No.: WO2022/269692
PCT Pub. Date: Dec. 29, 2022

(65) Prior Publication Data
US 2024/0272375 A1     Aug. 15, 2024

(51) Int. Cl.
*G02B 6/38*          (2006.01)
(52) U.S. Cl.
CPC .................................. *G02B 6/3882* (2013.01)
(58) Field of Classification Search
CPC ............................ G02B 6/3882; G02B 6/3883
See application file for complete search history.

(56) References Cited

U.S. PATENT DOCUMENTS

2002/0150349 A1* 10/2002 Shahid ................ G02B 6/3878
                                                  385/65
2019/0113691 A1     4/2019 Konegawa et al.
(Continued)

FOREIGN PATENT DOCUMENTS

JP          H07-43553 A       2/1995
JP          H08201651 A   *  8/1996
(Continued)

OTHER PUBLICATIONS

Takashi Matsui et al., "MT-type multi-core fiber fan-out connectors using a three-dimensional waveguide", General meeting of the Institute of Electronics, Information and Communication Engineers General Conference, B-13-25, 2018.

*Primary Examiner* — Chad H Smith
(74) *Attorney, Agent, or Firm* — Harness, Dickey & Pierce, P.L.C.

(57) ABSTRACT

An object of the present disclosure is to connect an optical fiber and an optical waveguide with a low loss.
The present disclosure is an optical connector plug, including: an optical waveguide having two guide pin V-grooves engraved on one surface thereof and having a cross section of one or more cores appearing between cross sections of the guide pin V-grooves on one end face thereof; two guide pins separately arranged in the two guide pin V-grooves; a flat substrate so fixed as to tuck the two guide pins in the two guide pin V-grooves on the one surface of the optical waveguide; and a fixing member equipped with the optical waveguide, the two guide pins, and the flat substrate.

6 Claims, 7 Drawing Sheets

(56)          References Cited

U.S. PATENT DOCUMENTS

2020/0379187 A1    12/2020   Matsui et al.
2021/0033802 A1*   2/2021   Morishima .......... G02B 6/3885

FOREIGN PATENT DOCUMENTS

| JP | 2010-243946 A | 10/2010 |
|----|---------------|---------|
| JP | 2017-191157 A | 10/2017 |
| WO | 2004/010191 A1 | 1/2004 |
| WO | WO-2019/131441 A1 | 7/2019 |

* cited by examiner

[1]

[2]

[3]

[4]

[5]

[6]

[7]

OPTICAL CONNECTOR PLUG, OPTICAL CONNECTOR AND MANUFACTURING METHOD OF OPTICAL WAVEGUIDE

CROSS-REFERENCE TO RELATED APPLICATIONS

This application is a 371 U.S. National Phase of International Application No. PCT/JP2021/023427, filed on Jun. 21, 2021. The entire disclosure of the above application is incorporated herein by reference.

TECHNICAL FIELD

The present disclosure relates to an optical connector plug for detachably connecting an optical fiber and an optical waveguide, an optical connector, and a method of manufacturing an optical waveguide.

BACKGROUND ART

An example of a related technique for connecting an optical fiber and an optical waveguide will be described. The optical fiber is loaded into a V-groove of a V-groove substrate, and the optical fiber is fixed between the V-groove substrate and a flat substrate with an adhesive with the flat substrate pressed from above, thereby bringing a state of a fiber block. A connection end face of the fiber block is polished. A connection end face of the optical waveguide is also polished. Light is injected into an end of the optical fiber of the fiber block, and the intensity of the light coming out from the end of the optical waveguide installed opposite to the optical fiber is monitored, so that cores of the optical fiber and the optical waveguide are aligned so as to coincide with each other. The optical fiber and the optical waveguide are connected by applying an adhesive to the connection end faces of the fiber block and the optical waveguide aligned with each other and curing the adhesive.

This related technique is applied on the precondition that the optical fiber and the optical waveguide are connected in a non-detachable manner in a factory, and are used in an optical communication facility with the connection maintained.

As a method for detachably connecting an optical fiber and an optical waveguide, a technique has been proposed in which a rectangular hole is formed between guide pin holes of an MT ferrule, an optical waveguide is installed in the rectangular hole, a guide pin and the guide pin holes are fitted together, and the optical fiber and the optical waveguide of the MT ferrule are connected together (see, for example, NPL 1).

CITATION LIST

Non Patent Literature

[NPL 1] Takashi Matsui, et al., MT-type multi-core fiber fan-out connectors using a three-dimensional waveguide," general meeting of the Institute of Electronics, Information and Communication Engineers General Conference, B-13-25, 2018

SUMMARY OF INVENTION

Technical Problem

FIG. 7 shows a configuration of a related optical connector plug. In FIG. 7, reference numeral 50 denotes an MT ferrule, 51 denotes an optical waveguide core, 52 denotes an optical waveguide, 55 denotes a guide pin, and 56 denotes a rectangular hole. In connecting to an optical fiber (not shown) of an opposing MT ferrule (not shown) with the optical waveguide 52, which has a core formed therein, built in the rectangular hole 56 provided between guide pins 55 of the MT ferrule 50, regarding the MT ferrules, the guide pin holes (not shown) of the opposing MT ferrule (not shown) and the guide pins 55 of the MT ferrule 50 are fitted together, and the optical fiber (not shown) of the opposing MT ferrule (not shown) and the optical waveguide core 51 of the MT ferrule 50 are connected.

However, in order to realize the same degree of connection accuracy, as that of the optical fibers of the ordinary MT ferrule, in the connection between the optical fibers (not shown) of the opposing MT ferrule (not shown) and the optical waveguide core 51 of the MT ferrule 50, it is necessary to prepare the rectangular hole 56 with high processing accuracy.

In order to allow the optical waveguide 52 to insert into the rectangular hole 56, a clearance is required between the optical waveguide 52 and the rectangular hole 56. In order to reduce the connection loss, the clearance must be reduced. Therefore, high processing accuracy is also required when the optical waveguide 52 is cut out as a chip.

In order to solve the foregoing problem, the present disclosure aims to detachably connect an optical fiber and an optical waveguide with a low loss.

Solution to Problem

In order to solve the foregoing problem, by providing the optical waveguide with a V-groove and by fixing a guide pin, for inserting into a guide pin hole of an MT ferrule, to the V-groove, the core of the optical fiber and the core of the optical waveguide are aligned with the accuracy of alignment between the guide pin hole of the MT ferrule and the guide pin.

Specifically, the present disclosure is an optical connector plug, including:

an optical waveguide having two guide pin V-grooves engraved on one surface thereof and having a cross section of one or more cores appearing between cross sections of the guide pin V-grooves on one end face thereof;

two guide pins separately arranged in the two guide pin V-grooves;

a flat substrate so fixed as to tuck the two guide pins in the two guide pin V-grooves on the one surface of the optical waveguide; and a fixing member equipped with the optical waveguide, the two guide pins, and the flat substrate.

According to this structure, the optical fiber and the optical waveguide can be detachably connected with low loss.

The present disclosure is also characterized in further including:

an alignment pin fixed to a surface, on a side in contact with the flat substrate, of the fixing member; and an alignment V-groove, locked to the alignment pin, on a surface, on a side in contact with the fixing member, of the flat substrate.

The present disclosure is also characterized in further including a marker on one surface of the optical waveguide.

The present disclosure is also characterized in that each cross-sectional center of the one or more cores is arranged on an imaginary line connecting cross-sectional centers of the two guide pins.

The present disclosure is also characterized in that the optical waveguide is an optical splitter in which one core is branched into a plurality of cores, cross sections of the plurality of cores appear on the one end face, and a cross section of the one core appears on the other end face, and a core of a single-core optical fiber is connected to the one core of the other end face.

The present disclosure is also characterized in that the optical waveguide is a fan-out for inputting and outputting an optical signal between one multi-core optical fiber having a plurality of cores and a plurality of different single-core optical fibers, cross sections of a plurality of cores appear in a linear arrangement on the one end face, and cross sections of a plurality of cores corresponding to the one multi-core optical fiber appear on the other end face, and cores of the multi-core optical fiber are separately connected to the plurality of cores of the other end face.

Specifically, the present disclosure is an optical connector, including:

the optical connector plug according to one or more of the clauses above; and an MT ferrule including guide pin holes fitted to two guide pins of the optical connector plug.

According to this structure, the optical fiber and the optical waveguide can be detachably connected with low loss.

Specifically, the present disclosure is an optical waveguide manufacturing method including the steps of:

forming a marker on a plane of an optical waveguide; and forming a core by laser irradiation with the marker taken as a reference.

According to this structure, an optical waveguide configured to be able to detachably connect an optical fiber and the optical waveguide with low loss can be manufactured.

Advantageous Effects of Invention

Thus, according to the present disclosure, the optical fiber and the optical waveguide can be detachably connected with low loss.

DESCRIPTION OF EMBODIMENTS

Figure 1:
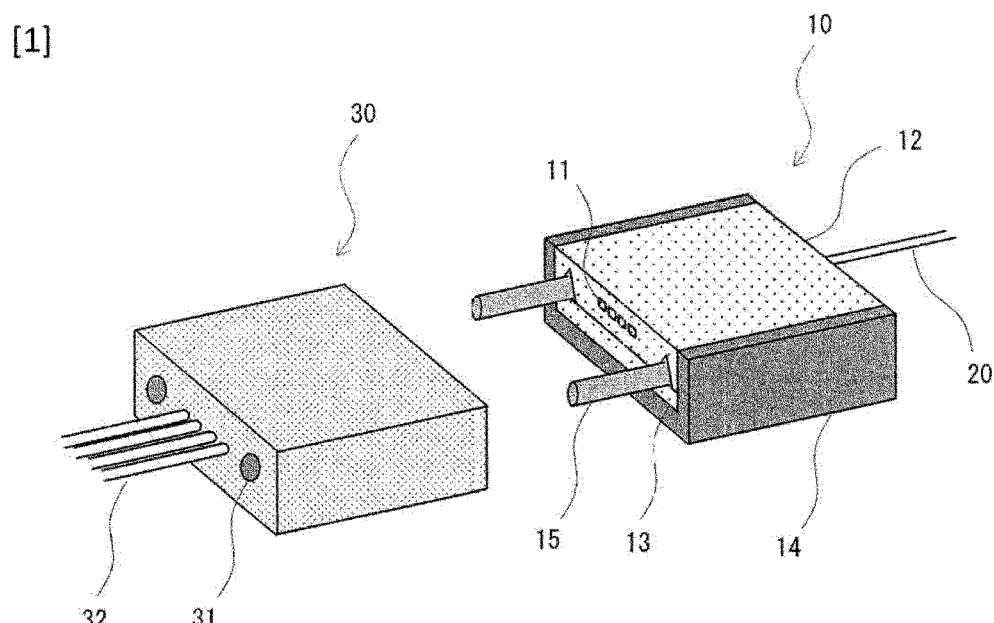
FIG. 1 is a schematic diagram showing an example of an embodiment of an optical connector of the present disclosure.

Embodiments of the present disclosure will be described hereinafter in detail with reference to the drawings. It is to be understood that the present disclosure is not limited to the embodiments described below. The embodiments are merely exemplary and the present disclosure can be implemented in various modified and improved modes based on knowledge of those skilled in the art. Constituent elements with the same reference signs in the present specification and in the drawings represent the same constituent elements.

Embodiment 1

Figure 2:
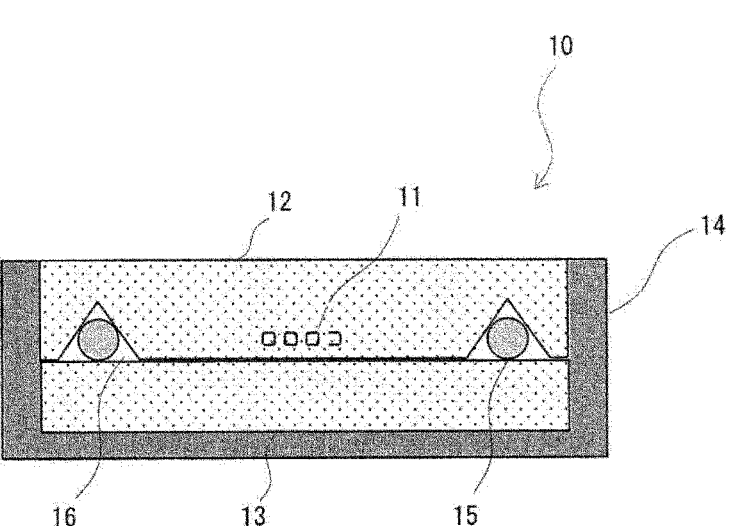
FIG. 2 is a schematic diagram showing an example of an embodiment of an optical connector plug of the present disclosure.
Figure 3:
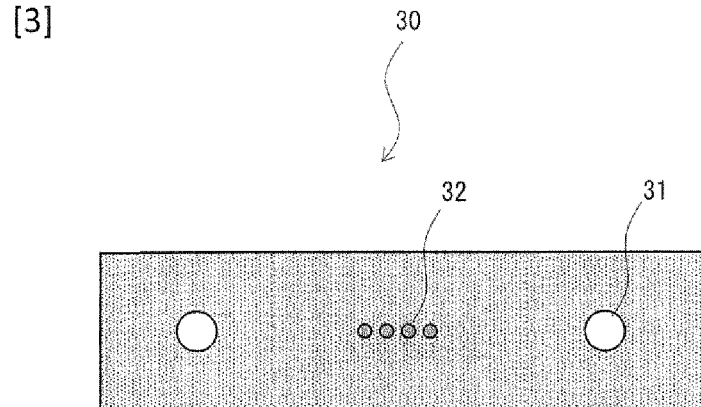
FIG. 3 is a schematic diagram of the connection end face side of an MT ferrule showing an example of the embodiment of the optical connector of the present disclosure.

The following describes an example of an optical connector that connects a four-core optical fiber and an optical waveguide having four cores in a detachable manner. FIG. 1 is a schematic diagram showing an example of an embodiment of an optical connector of the present disclosure. FIG. 2 is a schematic diagram showing an example of an embodiment of an optical connector plug of the present disclosure. FIG. 3 is a schematic diagram of the connection end face side of an MT ferrule showing an example of the embodiment of the optical connector of the present disclosure. In FIGS. 1, 2 and 3, reference numeral 10 denotes an optical connector plug, 11 denotes an optical waveguide core, 12 denotes an optical waveguide, 13 denotes a flat substrate, 14 denotes a fixing member, 15 denotes a guide pin, 16 denotes a guide pin V-groove, 20 denotes an optical fiber, 30 denotes an MT ferrule, 31 denotes a guide pin hole, and 32 denotes an optical fiber. The optical connector of the present embodiment includes the optical connector plug 10 and the MT ferrule 30.

The optical connector plug includes the optical waveguide 12, two guide pins 15, the flat substrate 13, and the fixing member 14. In the optical waveguide 12, two guide pin V-grooves 16 are engraved on one surface, and cross sections of four optical waveguide cores 11 appear between cross sections of the guide pin V-grooves 16 on one end face. The two guide pins 15 are separately arranged in the two guide pin V-grooves 16. The flat substrate 13 is so fixed to one surface of the optical waveguide 12 as to tuck the two guide pins 15 in the two guide pin V-grooves 16 on one surface of the optical waveguide 12. The fixing member 14 is equipped with the optical waveguide 12, the two guide pins 15, and the flat substrate 13.

The optical waveguide 12 and the flat substrate 13 are bonded and fixed to the fixing member 14. The guide pins 15 are bonded and fixed to the guide pin V-grooves 16 in a state where the optical waveguide 12 and the flat substrate 13 are overlapped so as to cover the two guide pin V-grooves 16. Guide pins used in an ordinary MT connector are employed as the guide pins 15. The optical waveguide cores 11 are formed with a glass member deposited on a substrate to be a base of silicon or the like, and the optical waveguide cores 11 are covered with a cladding member, so that light is conducted to the optical waveguide 12. The optical waveguide cores 11 are arranged in a plane shape in the glass member.

In the present embodiment, an optical splitter is used, as an example of the optical waveguide 12, for branching an optical signal transmitted through one single-core optical fiber into four single optical fibers. A single-core optical fiber is applied to the optical fiber 20. One end face of the optical waveguide 12 is connected to an end face of the MT ferrule 30. Cross sections of a plurality of cores appear on one end face of the optical waveguide 12, and a cross section of one core appears on the other end face on the side not connected to the MT ferrule 30. A core of the single-core optical fiber is connected, as the optical fiber 20, to one core on the other end face of the optical waveguide 12. The optical fiber 20 and the optical waveguide 12 are bonded and fixed to each other. The one end face, on the side in connect with the MT ferrule 30, of the optical waveguide 12 is polished.

On one end face of the optical waveguide 12 connected to the MT ferrule 30, the depth of the guide pin V-grooves 16 is designed and cutting is performed so that the cross-sectional centers of the optical waveguide cores 11 are arranged on an imaginary line connecting the cross-sectional centers of the two guide pins 15.

Figure 4:
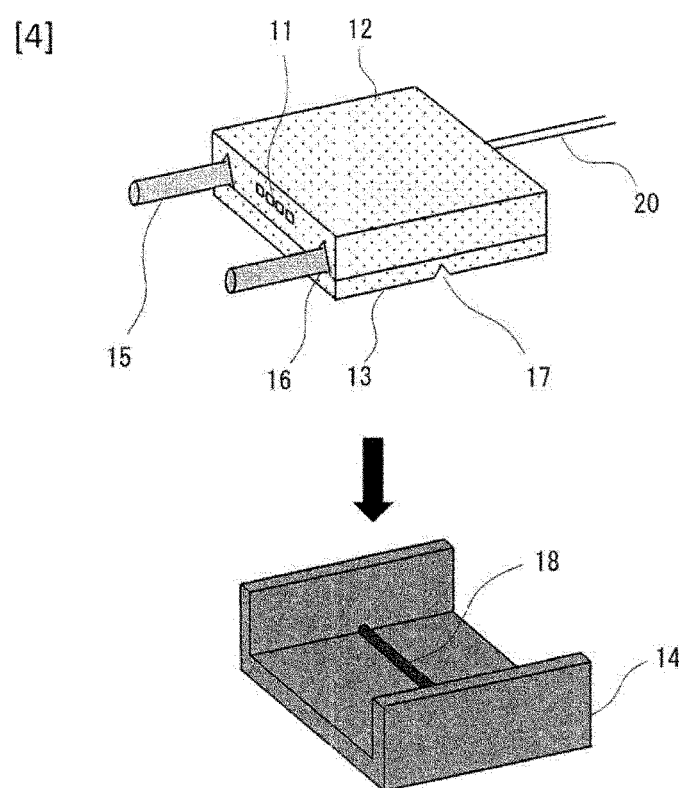
FIG. 4 is a diagram for explaining the alignment of an optical waveguide and a fixing member, showing an example of an embodiment of the optical connector plug of the present disclosure.

FIG. 4 is a diagram for explaining the alignment of the optical waveguide and the fixing member, showing an example of an embodiment of the optical connector plug of the present disclosure. In FIG. 4, numeral 11 denotes an optical waveguide core, 12 denotes an optical waveguide, 13 denotes a flat substrate, 14 denotes a fixing member, 15 denotes a guide pin, 16 denotes a guide pin V-groove, 17 denotes an alignment V-groove, 18 denotes an alignment pin, and 20 denotes an optical fiber.

The alignment pin 18 is bonded and fixed to the surface of the fixing member 14 on the side in contact with the flat substrate 13. The alignment V-groove 17 is engraved by cutting into the surface, on the side in contact with the fixing member 14, of the flat substrate 13. By fitting the alignment V-groove 17 with the alignment pin 18, the optical waveguide 12 and the flat substrate 13 are positioned in relation to the fixing member 14, bonded and fixed, and integrated with the fixing member 14.

In FIGS. 1, 2 and 3, four-core optical fibers 32 are bonded and fixed to optical fiber insertion holes of the MT ferrule 30, and the connection end face to the optical connector plug 10 is polished. The connection end face of the MT ferrule 30 is designed so that the centers of the optical fiber insertion holes are positioned on an imaginary line connecting the centers of the guide pin holes 31. Therefore, the centers of the core of the optical fibers 32 are also located on the imaginary line connecting the centers of the guide pin holes 31. By inserting the guide pins 15 fixed to the optical waveguide 12 into the guide pin holes 31 of the MT ferrule 30, the optical waveguide cores 11 and the cores of the optical fibers 32 can be connected in an aligned state. After the guide pins 15 and the guide pin holes 31 are fitted, the fitting state is maintained by a known clamp spring (not shown) used in an ordinary MT connector.

When the optical connector plug of the present disclosure is implemented in an optical waveguide having a structure in which an optical waveguide core is formed and the optical waveguide core is deposited by and covered with a cladding member, a guide pin V-groove and an alignment V-groove are engraved into the optical waveguide, in which the optical waveguide core formed beforehand. In the optical waveguide manufactured by this method, the core position of the manufactured optical waveguide is measured so that the position of the optical waveguide core on the connection end face is not shifted from a design value, and then the depth of the V-groove is designed and cutting is performed.

As described above, by using the optical connector plug of the present disclosure, the optical fiber and the optical waveguide can be detachably connected with a low loss.

Embodiment 2

Figure 5:
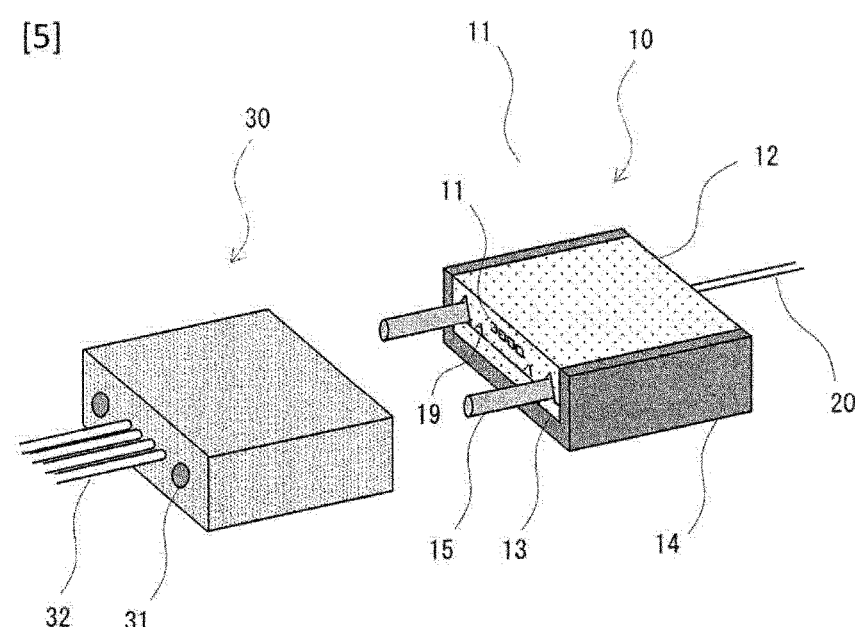
FIG. 5 is a schematic diagram showing an example of an embodiment of the optical connector of the present disclosure.
Figure 6:
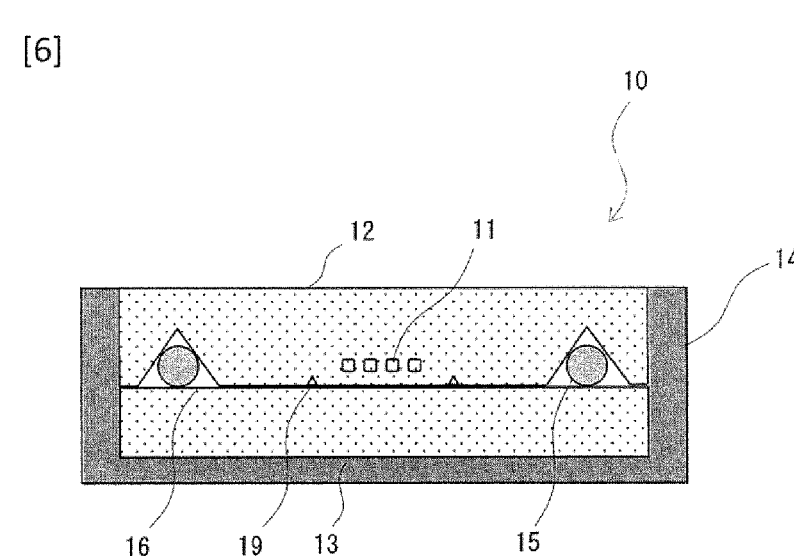
FIG. 6 is a schematic diagram showing an example of an embodiment of the optical connector plug of the present disclosure.
Figure 7:
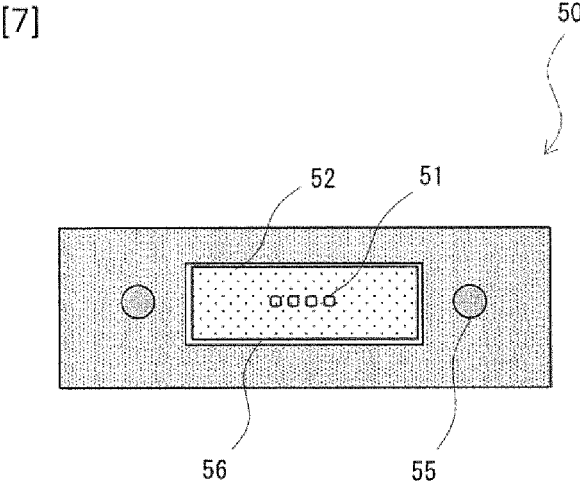
FIG. 7 is a diagram showing a configuration of a related optical connector plug.

The following describes an example of an optical connector that connects a four-core optical fiber and an optical waveguide having four cores in a detachable manner. FIG. 5 is a schematic diagram showing an example of an embodiment of an optical connector of the present disclosure. FIG. 6 is a schematic diagram showing an example of an embodiment of an optical connector plug of the present disclosure. In FIGS. 5 and 6, reference numeral 10 denotes an optical connector plug, 11 denotes an optical waveguide core, 12 denotes an optical waveguide, 13 denotes a flat substrate, 14 denotes a fixing member, 15 denotes a guide pin, 16 denotes a guide pin V-groove, 19 denotes a laser machining groove, 20 denotes an optical fiber, 30 denotes an MT ferrule, 31 denotes a guide pin hole, and 32 denotes an optical fiber. The optical connector of the present embodiment includes the optical connector plug 10 and the MT ferrule 30.

The difference from Embodiment 1 is that the optical waveguide 12 shown in FIGS. 5 and 6 is manufactured by a method of irradiating a glass member with a laser to form the optical waveguide cores 11 at a converging position. In the method of forming the optical waveguide cores 11 by the laser, the route of the optical waveguide cores 11 in the glass member can be arranged not only in a plane but also in a three-dimensional manner by moving the converging position of the laser in the glass member. In this example, the optical waveguide functions as a fan-out for inputting and outputting an optical signal conducted through each core of one multi-core fiber having four cores to and from four different optical fibers. A multi-core optical fiber is employed as the optical fiber 20. When the laser is radiated, since there is a marker to be a reference on the surface of the glass member, the radiation position of the laser can be operated with the marker taken as a reference, so that the position of the optical waveguide cores 11 can be formed with high accuracy. As shown in FIGS. 5 and 6, two laser machining grooves 19 are engraved into the optical waveguide 12 by cutting, and used as a marker taken as a reference in laser irradiation.

The two laser machining grooves 19 are preferably processed at positions, between which the optical waveguide cores 11 formed by the laser beam are located, between the two guide pin V-grooves 16 for installing the guide pins 15, and at positions of equal distances from the centers of the guide pin V-grooves 16. Since, in irradiating the glass member with the laser beam, the optical waveguide cores 11 is not formable by irradiating the glass member with the laser beam passed through the laser machining grooves 19, the laser machining grooves 19 are cut into positions between which the optical waveguide cores 11 are located. The depth of the laser machining grooves 19 from the surface is 50 μm or more, but it is preferred that the depth be shallower than the depth at which the optical waveguide cores 11 are formed. By setting the depth from the surface to 50 μm or more, the grooves can be accurately cut, and visibility as a marker in laser irradiation is improved. The present embodiment is greatly different from Embodiment 1 in that the laser machining grooves 19 are provided.

The cross sections of the plurality of cores appear in a linear arrangement on one end face, on the side in contact with the MT ferrule 30, of the optical waveguide 12 and the cross sections of the same number of cores appear on the other end face, on the side not connected to the MT ferrule 30, of the optical waveguide 12. Each core of the multi-core optical fiber, as the optical fiber 20, is connected to the plurality of cores on the other end face. The optical fiber 20 and the optical waveguide 12 are bonded and fixed to each other. The one end face, on the side in connect with the MT ferrule 30, of the optical waveguide 12 is polished.

Since the core position is controllable by controlling the laser irradiation position in an optical waveguide manufacturing method for forming an optical waveguide core by laser irradiation, the optical waveguide cores 11 are formed by laser irradiation by utilizing the laser machining grooves 19 as a marker for a glass member in which the guide pin V-grooves 16, the alignment V-groove (not shown), and the laser machining grooves 19 are engraved beforehand by cutting.

Although the present embodiment is illustrated by an optical waveguide which functions as a fan-out for outputting an optical signal conducted through each core from one single multi-core fiber having four cores to four different optical fibers, the present disclosure is applicable not only to a multi-core fiber having four cores but also to a multi-core fiber with the number of cores other than four. For example, the present disclosure can also be applied to a fan-out for outputting an optical signal, which has been conducted through each core from a multi-core fiber having eight cores, to eight different optical fibers. In this example, the MT ferrule is connected to an optical waveguide in a state where eight optical fibers are built in. Further, the present disclosure can be applied to an optical waveguide for distributing an optical signal from a multi-core fiber to another multi-core fiber. For example, the present disclosure can also be applied to an optical waveguide for distributing an optical signal conducted through each core from one multi-core fiber having eight cores to two multi-core fibers having four cores. In this example, two four-core multi-core fibers are incorporated in the MT ferrule.

As described above, by using the optical connector plug of the present disclosure, the optical fiber and the optical waveguide can be detachably connected with a low loss.

Embodiment 3

In Embodiment 1 or Embodiment 2, the end face of the MT ferrule and the end face of the optical waveguide are polished at right angles, and a refractive index matching material, having the refractive index matched with that of the core of the optical fiber, is used between the connection end faces to control Fresnel reflection caused by the difference in refractive index between the core and air, thereby achieving a high reflection attenuation amount. By polishing the MT ferrule end face and the optical waveguide end face at an angle of 8 degrees, a high reflection attenuation amount can be obtained without using the refractive index matching material. Therefore, the present invention can be implemented as an embodiment in which the connection end face is at diagonally 8 degrees. Also, the present invention can be implemented in the form of an MPO connector in which MT ferrules are built in plug housings and the plug housings are fitted to each other in an adapter with a guide pin and a guide pin hole. By incorporating the optical waveguide side in the plug housings of the MPO connector, the optical fiber and the optical waveguide can be attached and detached only by the operation of the plug housings.

INDUSTRIAL APPLICABILITY

The present disclosure is applicable to the optical communications industry.

REFERENCE SIGNS LIST

10: Optical connector plug
11: Optical waveguide core

8

12: Optical waveguide
13: Flat substrate
14: Fixing member
15: Guide pin
16: Guide pin V-groove
17: Alignment V-groove
18: Alignment pin
19: Laser machining groove
20: Optical fiber
30: MT ferrule
31: Guide pin hole
32: Optical fiber
50: MT ferrule
51: Optical waveguide core
52: Optical waveguide
55: Guide pin
56: Rectangular hole

The invention claimed is:

1. An optical connector plug, comprising: an optical waveguide having two guide pin V-grooves engraved on one surface thereof and having a cross section of one or more cores appearing between cross sections of the guide pin V-grooves on one end face thereof, two guide pins separately arranged in the two guide pin V-grooves; a flat substrate so fixed as to tuck the two guide pins in the two guide pin V-grooves on the one surface of the optical waveguide; two laser processing grooves engraved in the one surface of the optical waveguide; a fixing member equipped with the optical waveguide, the two guide pins, and the flat substrate; and an alignment pin fixed to a surface, on a side in contact with the flat substrate, of the fixing member; and an alignment V-groove, locked to the alignment pin, on a surface of the flat substrate on a side in contact with the fixing member.

2. The optical connector plug according to claim 1, wherein the two laser processing grooves are positioned between the two guide pin V-grooves and are equal distance from center of an adjacent guide pin V-groove.

3. The optical connector plug according to claim 1, wherein each cross-sectional center of the one or more cores is arranged on an imaginary line connecting cross-sectional centers of the two guide pins.

4. The optical connector plug according to claim 1, wherein the optical waveguide is an optical splitter in which one core is branched into a plurality of cores, cross sections of the plurality of cores appear on the one end face, and a cross section of the one core appears on the other end face, and a core of a single-core optical fiber is connected to the one core of the other end face.

5. The optical connector plug according to claim 1, wherein the optical waveguide is a fan-out for inputting and outputting an optical signal between one multi-core optical fiber having a plurality of cores and a plurality of different single-core optical fibers, cross sections of a plurality of cores appear in a linear arrangement on the one end face, and cross sections of a plurality of cores corresponding to the one multi-core optical fiber appear on the other end face, and cores of the multi-core optical fiber are separately connected to the plurality of cores of the other end face.

6. An optical connector, comprising:
the optical connector plug according to claim 1; and
an MT ferrule including guide pin holes fitted to two guide pins of the optical connector plug.

* * * * *